United States Patent
Sugaya

(10) Patent No.: US 10,509,899 B2
(45) Date of Patent: Dec. 17, 2019

(54) INFORMATION DEVICE OPERATING SYSTEM, INFORMATION DEVICE OPERATING METHOD AND PROGRAM FOR OPERATING INFORMATION DEVICE BASED ON AUTHENTICATION

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 16/302,116

(22) PCT Filed: May 17, 2016

(86) PCT No.: PCT/JP2016/064662
§ 371 (c)(1),
(2) Date: Nov. 16, 2018

(87) PCT Pub. No.: WO2017/199353
PCT Pub. Date: Nov. 23, 2017

(65) Prior Publication Data
US 2019/0286807 A1    Sep. 19, 2019

(51) Int. Cl.
| | | |
|---|---|---|
| *G06F 21/40* | (2013.01) | |
| *G06F 21/32* | (2013.01) | |
| *H04L 29/06* | (2006.01) | |
| *H04M 11/00* | (2006.01) | |
| *H04Q 9/00* | (2006.01) | |
| *H04L 29/08* | (2006.01) | |

(52) U.S. Cl.
CPC .............. *G06F 21/40* (2013.01); *G06F 21/32* (2013.01); *H04L 63/0861* (2013.01); *H04M 11/00* (2013.01); *H04Q 9/00* (2013.01); *H04L 67/12* (2013.01)

(58) Field of Classification Search
None
See application file for complete search history.

(56) References Cited

U.S. PATENT DOCUMENTS

2005/0188226 A1    8/2005  Kasatani
2007/0186106 A1*   8/2007  Ting .................... H04L 63/0815
                                                713/168

(Continued)

FOREIGN PATENT DOCUMENTS

| JP | 2003-150551 | 5/2003 |
| JP | 2005-242521 | 9/2005 |

(Continued)

*Primary Examiner* — William J. Goodchild
(74) *Attorney, Agent, or Firm* — Lex IP Meister, PLLC

(57) ABSTRACT

It is an object to provide an information device operating system, an information device operating method, and a program, which improve usability and security. An information device operating system 1 including an information terminal 100 provided with a biometric authentication or a camera authentication and an information device 200 connected to the information terminal 100 via a network, detects that the biometric authentication or camera authentication has been made, and operates the information device 200 by using an application installed in the information terminal 100 when detecting that the biometric authentication or camera authentication has been made.

14 Claims, 10 Drawing Sheets

(56) References Cited

U.S. PATENT DOCUMENTS

| | | | |
|---|---|---|---|
| 2009/0133051 A1* | 5/2009 | Hildreth | H04N 5/4403 |
| | | | 725/28 |
| 2012/0278614 A1 | 11/2012 | Choi | |
| 2013/0080898 A1* | 3/2013 | Lavian | G06F 3/16 |
| | | | 715/728 |
| 2015/0012863 A1 | 1/2015 | Yoshida et al. | |
| 2015/0049923 A1 | 2/2015 | Nobutani | |
| 2015/0312041 A1* | 10/2015 | Choi | H04L 9/3231 |
| | | | 713/175 |
| 2016/0112434 A1* | 4/2016 | Chung | H04W 4/70 |
| | | | 726/4 |
| 2017/0011573 A1* | 1/2017 | Belhadia | E05B 47/0615 |

FOREIGN PATENT DOCUMENTS

| | | |
|---|---|---|
| JP | 2005-248542 | 9/2005 |
| JP | 2005-303376 | 10/2005 |
| JP | 2008-131081 | 6/2008 |
| JP | 2008-199197 | 8/2008 |
| JP | 2010-074782 | 4/2010 |
| JP | 2012-161001 | 8/2012 |
| JP | 2014-164359 | 9/2014 |
| JP | 2015-036918 | 2/2015 |
| WO | 2014/103308 | 7/2014 |

\* cited by examiner

INFORMATION DEVICE OPERATING SYSTEM, INFORMATION DEVICE OPERATING METHOD AND PROGRAM FOR OPERATING INFORMATION DEVICE BASED ON AUTHENTICATION

TECHNICAL FIELD

The present invention relates to an information device operating system including an information terminal equipped with biometric authentication or camera authentication and an information device connected to the information terminal via a network, an information device operating method, and a program.

BACKGROUND ART

In recent years, there are IoT (Internet of Things) devices which connect to terminal devices such as information terminals via a public network such as the Internet. When such an IoT device is operated by the information terminal, authentication using a user name, a password, or the like, or authentication using SSH is performed. A user can operate the IoT device by operating the authenticated information terminal.

As the operation authentication of the IoT device, a configuration is disclosed in which the authentication process is executed on the information terminal and the IoT device can be controlled when it has been authenticated (refer to Patent Document 1).

PRIOR ART DOCUMENT

Patent Document

Patent Document 1: Japanese Patent Application Publication No. 2005-303376

SUMMARY OF THE INVENTION

Technical Problem

However, in the configuration described in Patent Document 1, it is necessary to execute authentication with a public key for each application to operate the IoT device. Because an operator needs to input the authentication of the IoT device to be operated each time, the convenience is low. Even if the operator of the information terminal is an illegal operator different from an original operator, there is a possibility that the authentication is executed and the illegal operator can operate the IoT device, so that the security is low.

An object of the present invention is to provide an information device operating system, an information device operation method, and a program with improved convenience and security.

Technical Solution

The present invention provides the following solutions.

An invention according to a first aspect provides an information device operating system including an information terminal provided with a biometric authentication and an information device connected to the information terminal via a network, the information device operating system including a detecting unit that detects that the biometric authentication has been made, and an operation unit that operates the information device by using an application installed in the information terminal when it is detected that the biometric authentication has been made.

According to the first aspect of the invention, an information device operating system including an information terminal provided with a biometric authentication and an information device connected to the information terminal via a network, detects that the biometric authentication has been made, and operates the information device by using an application installed in the information terminal when it is detected that the biometric authentication has been made.

The invention according to the first aspect is a category of the information device operating system, but even in other categories such as a method or a program, exhibits the same action and effect corresponding to the category.

An invention according to a second aspect provides an information device operating system including an information terminal provided with a camera authentication and an information device connected to the information terminal via a network, the information device operating system including a detecting unit that detects that the camera authentication has been made, and an operation unit that operates the information device by using an application installed in the information terminal when it is detected that the camera authentication has been made.

According to the second aspect of the invention, an information device operating system including an information terminal provided with a camera authentication and an information device connected to the information terminal via a network, detects that the camera authentication has been made, and operates the information device by using an application installed in the information terminal when it is detected that the camera authentication has been made.

The invention according to the second aspect is a category of the information device operating system, but even in other categories such as a method or a program, exhibits the same action and effect corresponding to the category.

An invention according to a third aspect provides an information device operating system which is the invention according to the first or second aspect, wherein the application is a standardized application, and wherein the operation unit operates the information device by using the standardized application.

According to the third aspect of the invention, the information device operating system, which is the invention according to the first or second aspect, when the application is a standardized application, operates the information device by using the standardized application.

An invention according to a fourth aspect provides an information device operating system which is the invention according to the first aspect, wherein the operation unit operates the information device by using the application when it is detected that biometric authentications for a predetermined number of people have been made.

According to the fourth aspect of the invention, the information device operating system, which is the invention according to the first aspect, operates the information device by using the application when it is detected that biometric authentications for a predetermined number of people have been made.

An invention according to a fifth aspect provides an information device operating system which is the invention according to the second aspect, wherein the operation unit operates the information device by using the application when it is detected that camera authentications for a predetermined number of people have been made.

According to a fifth aspect of the invention, the information device operating system, which is the invention according to the second aspect, operates the information device by using the application when it is detected that camera authentications for a predetermined number of people have been made.

An invention according to a sixth aspect provides an information device operating method including an information terminal provided with a biometric authentication and an information device connected to the information terminal via a network, the information device operating method including detecting that the biometric authentication has been made, and operating the information device by using an application installed in the information terminal when detecting that the biometric authentication has been made.

An invention according to a seventh aspect provides an information device operating method including an information terminal provided with a camera authentication and an information device connected to the information terminal via a network, the information device operating method including detecting that the camera authentication has been made, and operating the information device by using an application installed in the information terminal when detecting that the camera authentication has been made.

An invention according to an eighth aspect provides a program for causing an information device operating system including an information terminal provided with a biometric authentication and an information device connected to the information terminal via a network to execute detecting that the biometric authentication has been made and operating the information device by using an application installed in the information terminal when detecting that the biometric authentication has been made.

An invention according to a ninth aspect provides a program for causing an information device operating system including an information terminal provided with a camera authentication and an information device connected to the information terminal via a network to execute detecting that the camera authentication has been made, and operating the information device by using an application installed in the information terminal when detecting that the camera authentication has been made.

Effects of the Invention

According to the present invention, it is possible to provide an information device operating system, an information device operating method, and a program, which improves convenience and security.

DETAILED DESCRIPTION OF THE EMBODIMENTS

Hereinafter, embodiments for carrying out the present invention are described with reference to the drawings. It is to be understood that the embodiments are merely examples and the scope of the present invention is not limited to the disclosed embodiments.

Overview of Information Device Operating System 1

Figure 1:
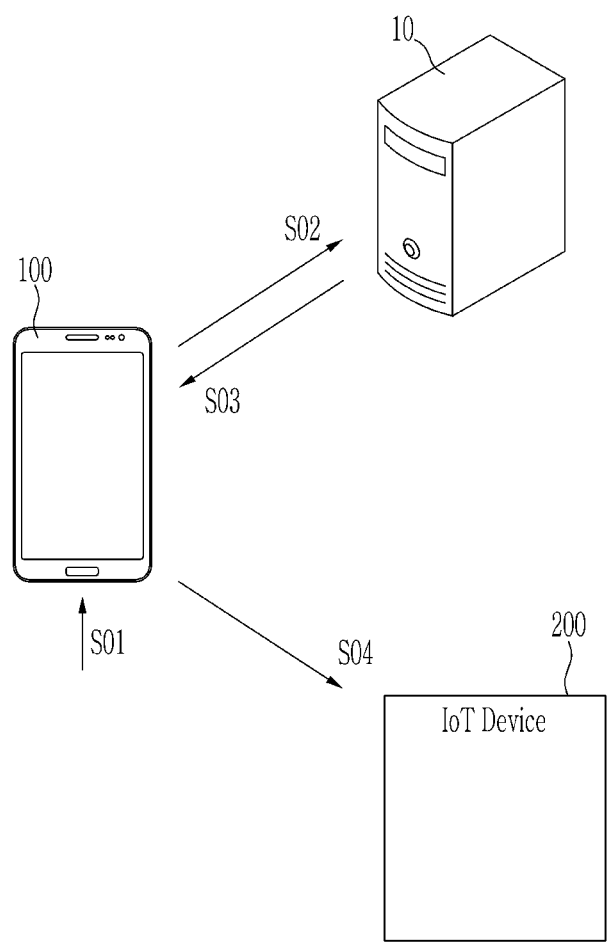
FIG. 1 is a diagram showing an overview of the information device operating system 1.

An overview of the present invention is described with reference to FIG. 1. FIG. 1 is a diagram for explaining an overview of an information device operating system 1 which is a preferred embodiment of the present invention. The information device operating system 1 includes a server 10, an information terminal 100, and an information device 200. Besides, the number of the information terminal(s) 100 and the number of the information device(s) 200 are not limited to one, but may be two or more. Further, each process to be described below may be realized by any one of the server 10, the information terminal 100, and the information device 200, or a combination of two or more. Furthermore, the information device operating system 1 may be configured without the server. In this case, each process to be described below may be realized by either of the information terminal 100 or the information device 200, or both of them.

The server 10 is a server device capable of performing data communication with the information terminal 100.

The information terminal 100 is a terminal device capable of performing data communication with the server 10 and the information device 200. The information terminal 100 is, for example, a mobile phone, a portable information terminal, a tablet terminal, a personal computer, an electric appliance such as a netbook terminal, a slate terminal, an electronic book terminal, or a portable music player, a wearable terminal such as a smart glasses or a head mount display, or other goods.

The information device 200 is an IoT device capable of performing data communication with the information terminal 100. The information device 200 is, for example, a device or system, such as a drone, an electric appliance, or an energy monitoring system, which is connectable to a public line network such as the Internet.

First, the information terminal 100 accepts a user authentication by a biometric authentication or a camera authentication (step S01). The biometric authentication is, for example, a fingerprint authentication, an iris authentication, a vein authentication, or a voice print authentication. The camera authentication is, for example, an authentication by capturing the information terminal itself by an image capturing device such as a camera of the information terminal 100 and performing image analysis on a captured image which is captured, or an authentication by accepting a gesture operation by a user. Besides, the user authentication may have a configuration other than the above-described configuration.

The information terminal 100 transmits authentication data, which is data on the accepted user authentication, to the server 10 (step S02). The server 10 receives the authentication data. The server 10 determines whether the received authentication data matches characteristics of the user registered in advance, and transmits the authentication result to the information terminal 100 (step S03).

The information terminal 100 receives the authentication result. When the received authentication result indicates that they match, the information terminal 100 makes it possible for an application to execute the operation of the information device 200 (step S04). On the other hand, when the received authentication result indicates that they do not match, the information terminal 100 makes it impossible for the application to execute the operation of the information device 200.

Besides, one information device 200 may correspond to one application and the one information device 200 may be operated by the one application. Alternatively, a plurality of information devices 200 may be operated by a standard application that is standardized to correspond to the plurality of information devices. For example, when one information device 200 corresponds to one application, the above-described authentication is executed for each information device 200, and a corresponding information device 200 is operated by each application. The standard application means an application capable of operating a plurality of information devices 200. When the plurality of information devices 200 correspond to the standard application, the above-described authentication is executed in the standard application, and the plurality of information devices 200 are operated by the standard application.

The above is the overview of the information device operating system 1.

System Configuration of Information Device Operating System 1

Figure 2:
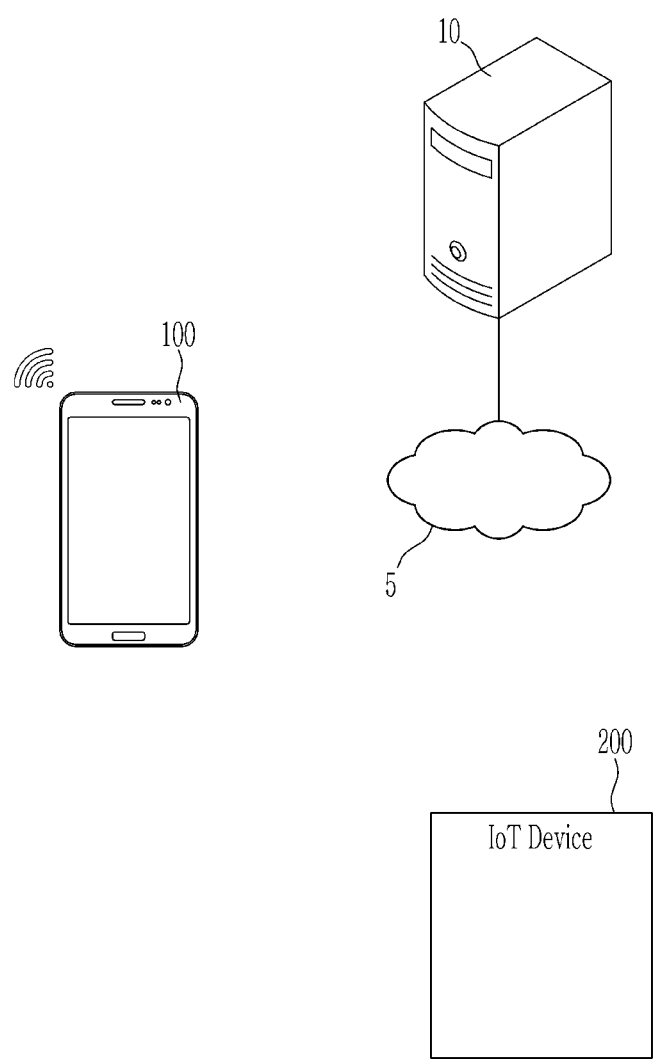
FIG. 2 is an overall configuration diagram of an information device operating system 1.

A system configuration of the information device operating system 1 is described with reference to FIG. 2. FIG. 2 is a diagram showing a system configuration of an information device operating system 1 which is a preferred embodiment of the present invention. The information device operating system 1 includes a server 10, an information terminal 100, an information device 200, and a public line network (Internet network, third or fourth generation communication network, or the like) 5. Besides, a plurality of information terminals 100 and a plurality of information devices 200 may be provided. Further, each process to be described below may be realized by any one of the server 10, the information terminal 100, and the information device 200, or a combination of two or more.

The server 10 is the above-described server device having functions to be described below.

The information terminal 100 is the above-described terminal device having functions to be described below.

The information device 200 is the IoT device having functions to be described below.

Description of Each Function

Figure 3:
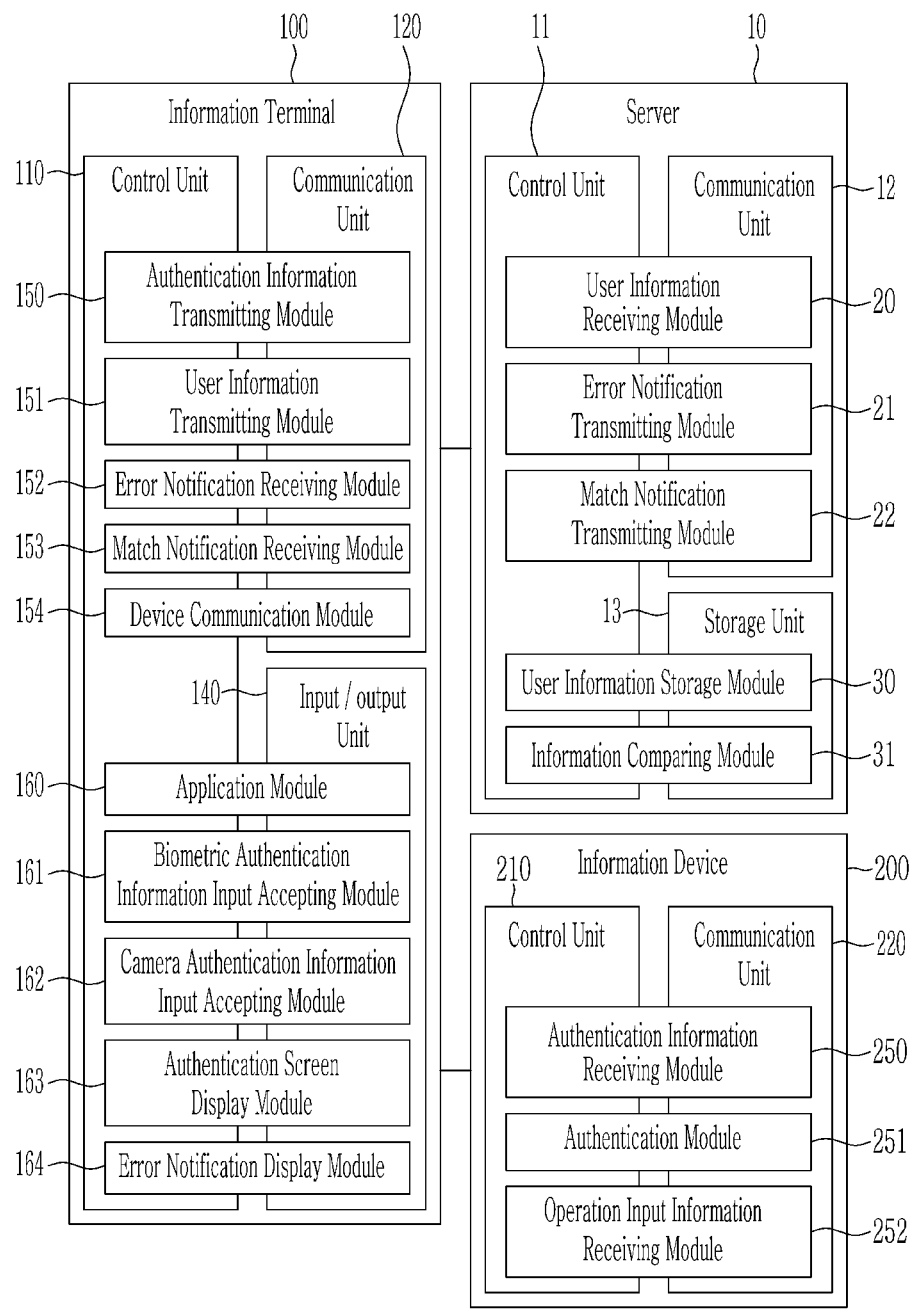
FIG. 3 is a functional block diagram of a server 10, an information terminal 100, and an information device 200.

Functions of an information device operating system 1 are described with reference to FIG. 3. FIG. 3 is a functional block diagram of a server 10, an information terminal 100, and an information device 200.

The server 10 includes, as a control unit 11, a CPU (Central Processing Unit), a RAM (Random Access Memory), a ROM (Read Only Memory), and the like, and includes, as a communication unit 12, a device for enabling communication with other devices, for example, a WiFi (Wireless Fidelity) compatible device conforming to IEEE 802.11. In addition, the server 10 includes, as a storage unit 13, a data storage unit such as a hard disk, a semiconductor memory, a recording medium, a memory card, or the like.

In the server 10, the control unit 11 reads a predetermined program, thereby realizing a user information receiving module 20, an error notification transmitting module 21, and a match notification transmitting module 22 in cooperation with the communication unit 12. In addition, in the server 10, the control unit 11 reads a predetermined program, thereby realizing a user information storage module 30 and an information comparing module 31 in cooperation with the storage unit 13.

Like the server 10, the information terminal 100 includes, as a control unit 110, a CPU, a RAM, a ROM, and the like, and includes, as a communication unit 120, a device for enabling communication with other devices or the like. In addition, the information terminal 100 includes, as an input/output unit 140, a display unit for outputting and displaying data and images controlled by the control unit 110, an input unit, such as a touch panel, a keyboard, or a mouse, for accepting an input from a user, an image capturing device such as lens or an imaging device, a reading device for reading biometric authentication information of the user, or the like.

In the information terminal 100, the control unit 110 reads a predetermined program, thereby realizing, an authentication information transmitting module 150, a user information transmitting module 151, an error notification receiving module 152, a match notification receiving module 153, and a device communication module 154 in cooperation with the communication unit 120. In addition, in the information terminal 100, the control unit 110 reads a predetermined program, thereby realizing an application module 160, a biometric authentication information input accepting module 161, a camera authentication information input accepting module 162, an authentication screen display module 163, and an error notification display module 164 in cooperation with the input/output unit 140.

Like the server 10 and the information terminal 100, the information device 200 includes, as a control unit 210, a CPU, a RAM, a ROM, and the like, and includes, as a communication unit 220, a device for enabling communication with other devices or the like. In addition, the information device 200 includes various devices on which each IoT device executes various functions. For example, when the information device 200 is a drone, it includes a flying device, an image capturing device, or the like.

In the information device 200, the control unit 210 reads a predetermined program, thereby realizing an authentication information receiving module 250, an authentication module 251, and an operation input information receiving module 252 in cooperation with the communication unit 220.

Device Authentication Process

Figure 4:
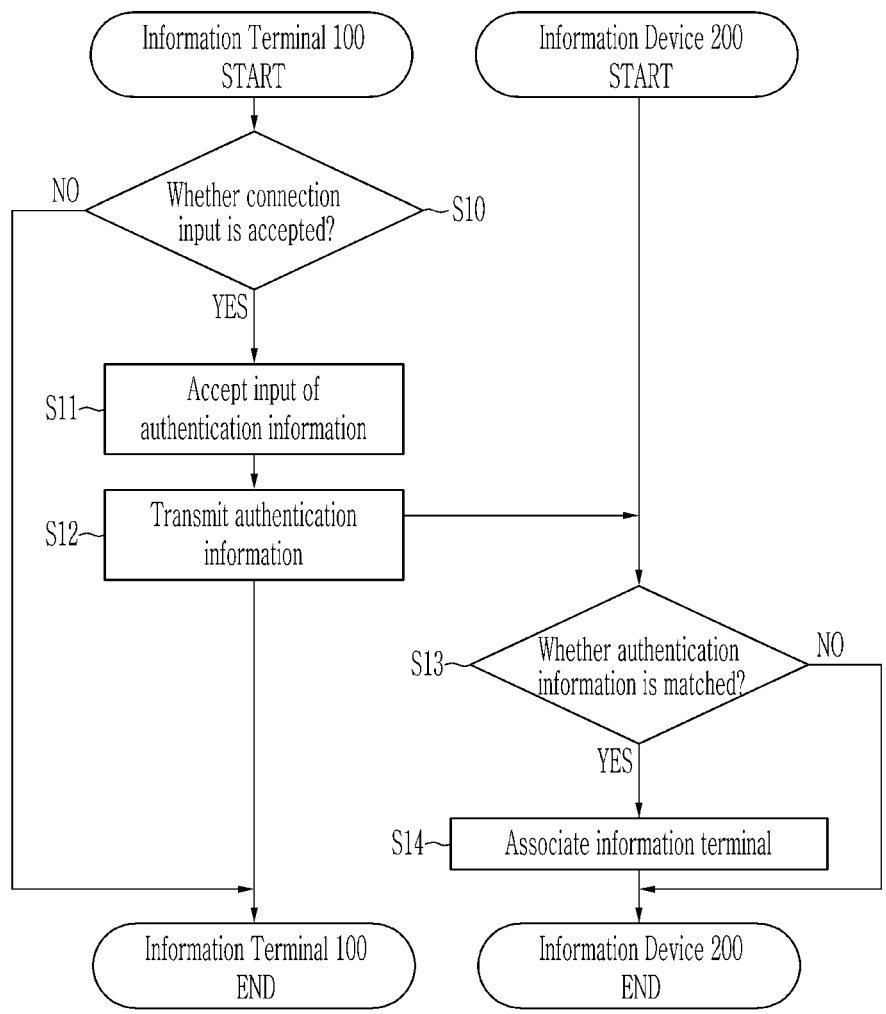
FIG. 4 is a flowchart showing a device authentication process executed by an information terminal 100 and an information device 200.

A device authentication process executed by an information device operating system 1 is described with reference to FIG. 4. FIG. 4 is a diagram showing a flowchart of a device authentication process executed by an information terminal 100 and an information device 200. The processing executed by the above-described modules of each device is described together with this processing.

An application module 160 activates an application and determines whether an input for newly connecting the information device 200 has been accepted (step S10). In step S10, the application activated by the application module 160 may be one application corresponding to one information device 200, or may be a standard application that is an application standardized to correspond to a plurality of information devices 200. The input for new connection is, for example, an input for detecting the information device 200 to be newly connected. The application module 160 detects, by the activated application, the information device 200 which has never been connected.

In step S10, when the application module 160 determines that the input for newly connecting the information device 200 has not been accepted (NO in step S10), the application module 160 ends the present process. On the other hand, when the application module 160 determines that the input for newly connecting the information device 200 has been accepted (YES in step S10), the application module 160 accepts an input of authentication information (step S11). The authentication information is an input that associates the information terminal 100 on which the application is installed with the newly detected information device 200. Specifically, it accepts the input of an SSID, a password or the like of the information device 200.

An authentication information transmitting module 150 transmits the received authentication information to the information device 200 (step S12).

An authentication information receiving module 250 receives the authentication information. An authentication module 251 determines whether the received authentication information and its own authentication information match (step S13). In step S13, the authentication module 251 determines whether its own SSID, password or the like matches the received one. In step S13, when the authentication module 251 determines that they do not match (NO in step S13), the authentication module 251 ends the present process. At this time, the information device 200 may transmit an error notification indicating mismatch of the authentication information to the information terminal 100, and the information terminal 100 may display the error notification.

On the other hand, in step S13, when the authentication module 251 determines that they match (YES in step S13), the authentication module 251 associates the information terminal 100 that has transmitted the authentication information with itself (step S14).

Further, this process may be configured to use a biometric authentication or a camera authentication to be described below as the authentication information. In this case, the server 10 or the information terminal 100 may configured to determine whether the authentication has succeeded based on authentication information acquired by the biometric authentication or the camera authentication, and associate the information terminal 100 with the information device 200.

The above is the device authentication process.

User Information Registration Process

Figure 5:
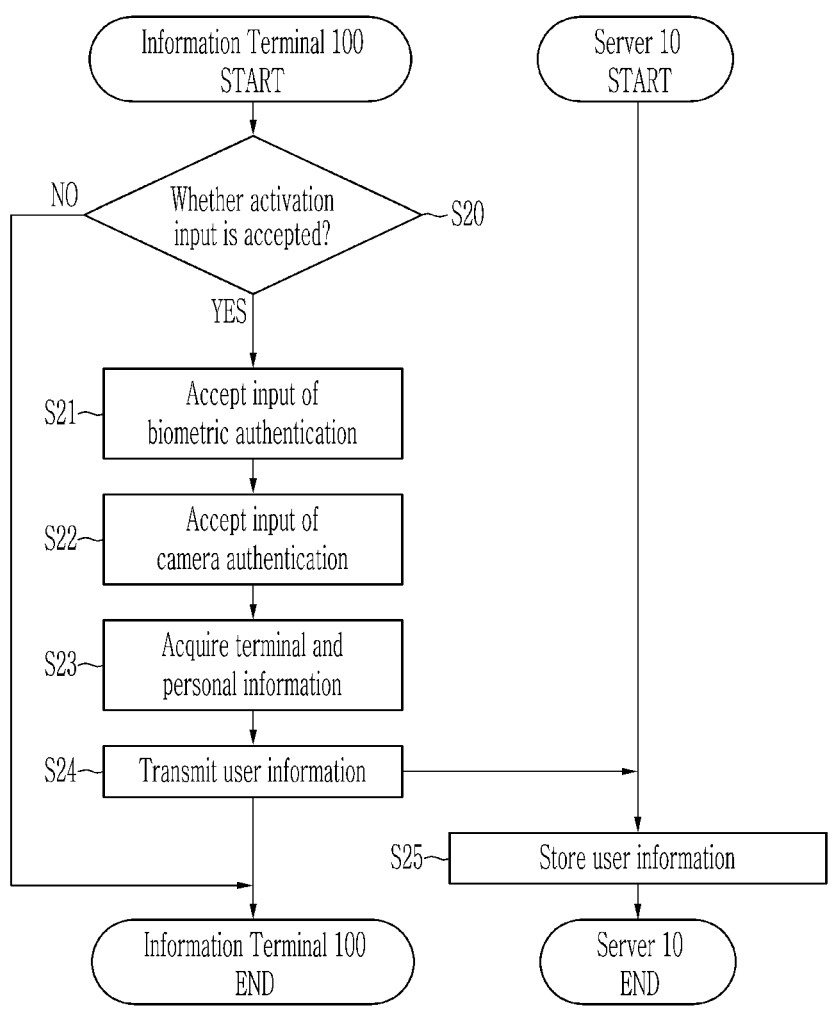
FIG. 5 is a flowchart showing a user information registration process executed by a server 10 and an information terminal 100.

Next, a user information registration process executed by an information device operating system 1 is described with reference to FIG. 5. FIG. 5 is a flowchart showing a user information registration process executed by a server 10 and an information terminal 100. The processing executed by the above-described modules of each device is described together with this processing.

An application module 160 determines whether an activation input of an application for executing a user authentication has been accepted (step S20). The user authentication is a biometric authentication or a camera authentication. The biometric authentication is, for example, an authentication based on a fingerprint, iris, vein, or voice print. Further, the camera authentication is an authentication based on a feature amount that is extracted by performing image analysis on a captured image captured by an image capturing device or the like. For example, it is a feature amount of a user's face picture or a gesture according to a movement of a user's body.

In step S20, when the application module 160 determines that the input has not been accepted (NO in step S20), the application module 160 ends the present process. On the other hand, in step S20, when it is determined that the input has been accepted (YES in step S20), a biometric authentication information input accepting module 161 accepts an input of a biometric authentication (step S21). In step S21, the biometric authentication information input accepting module 161 accepts the input from various sensors, an image capturing device, or the like.

In step S21, the biometric authentication information input accepting module 161 may accept a plurality of biometric authentications, or may accept one biometric authentication. Further, the biometric authentication may have a configuration other than the above-described configuration.

Next, a camera authentication information input accepting module 162 accepts an input of a camera authentication (step S22).

In step S22, the camera authentication information input accepting module 162 may accept a plurality of camera authentications, or may accept one camera authentication. Further, the camera authentication may have a configuration other than the above-described configuration.

Further, in the above-described processing of step S21 and step S22, only one of step S21 and step 22 may be executed. In this case, the processing that is not executed may be omitted. Furthermore, the order of steps S21 and S22 may be reversed.

The application module 160 acquires terminal information such as an identifier, telephone number, manufacturing number, IP address, MAC address or the like of the information terminal 100, or personal information such as a user's name, mail address, telephone number, or attribute of the information terminal 100 (step S23). The attribute is, for example, an age, occupation, or address. In step S23, the application module 160 acquires the terminal information or the personal information from a telephone directory application, a setting application, or the like. Further, the application module 160 may be configured to acquire the terminal information and the personal information by a configuration other than the above-described configuration.

A user information transmitting module 151 transmits user information including the above-described biometric authentication information, camera authentication information, terminal information, and personal information to the server 10 (step S24). In step S24, it is sufficient that the user information includes at least the biometric information or the camera authentication information, and other information may be appropriately changed.

A user information receiving module 20 receives the user information. A user information storage module 30 stores the received user information (step S25). In step S25, the user information storage module 30 stores the biometric authentication information, the camera authentication information, the terminal information, and the personal information in association with each other.

The above is the user information registration process.

Device Operation Process

Figure 6:
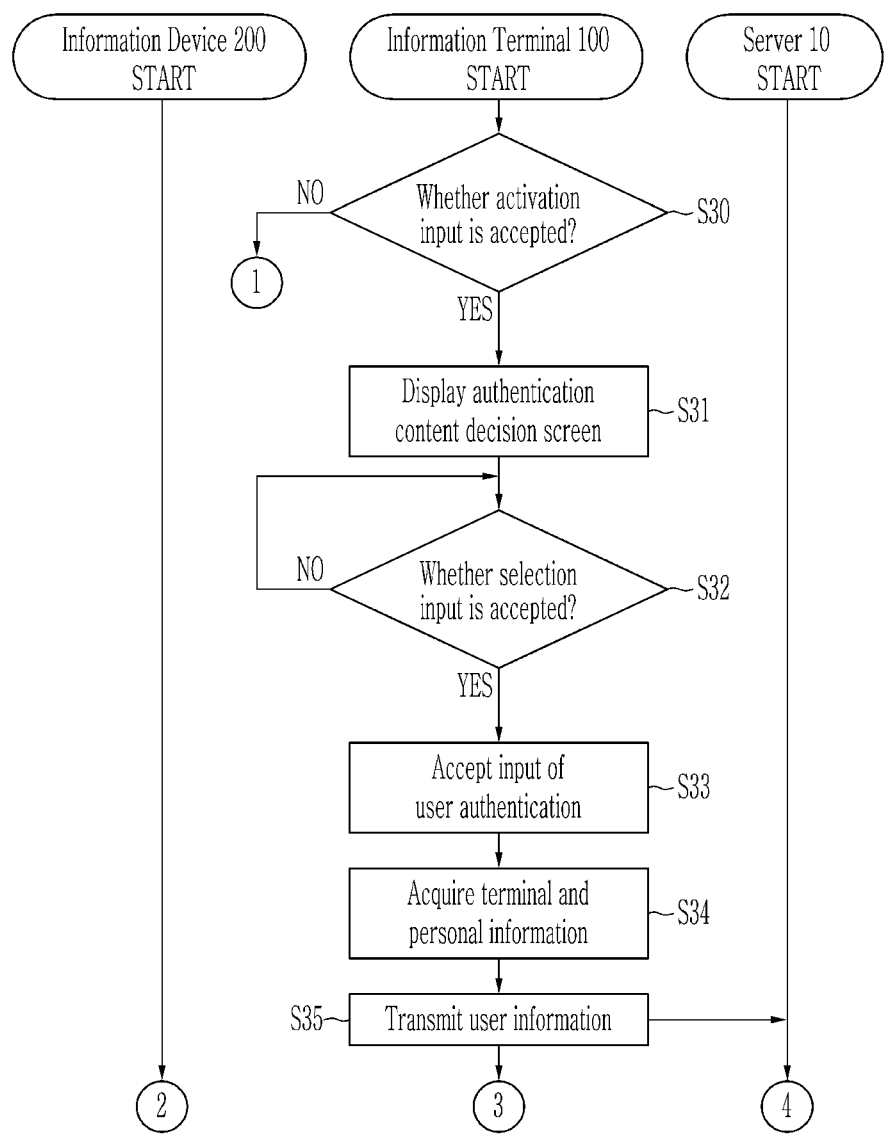
FIG. 6 is a flowchart showing a device operation process executed by a server 10, an information terminal 100, and an information device 200.
Figure 7:
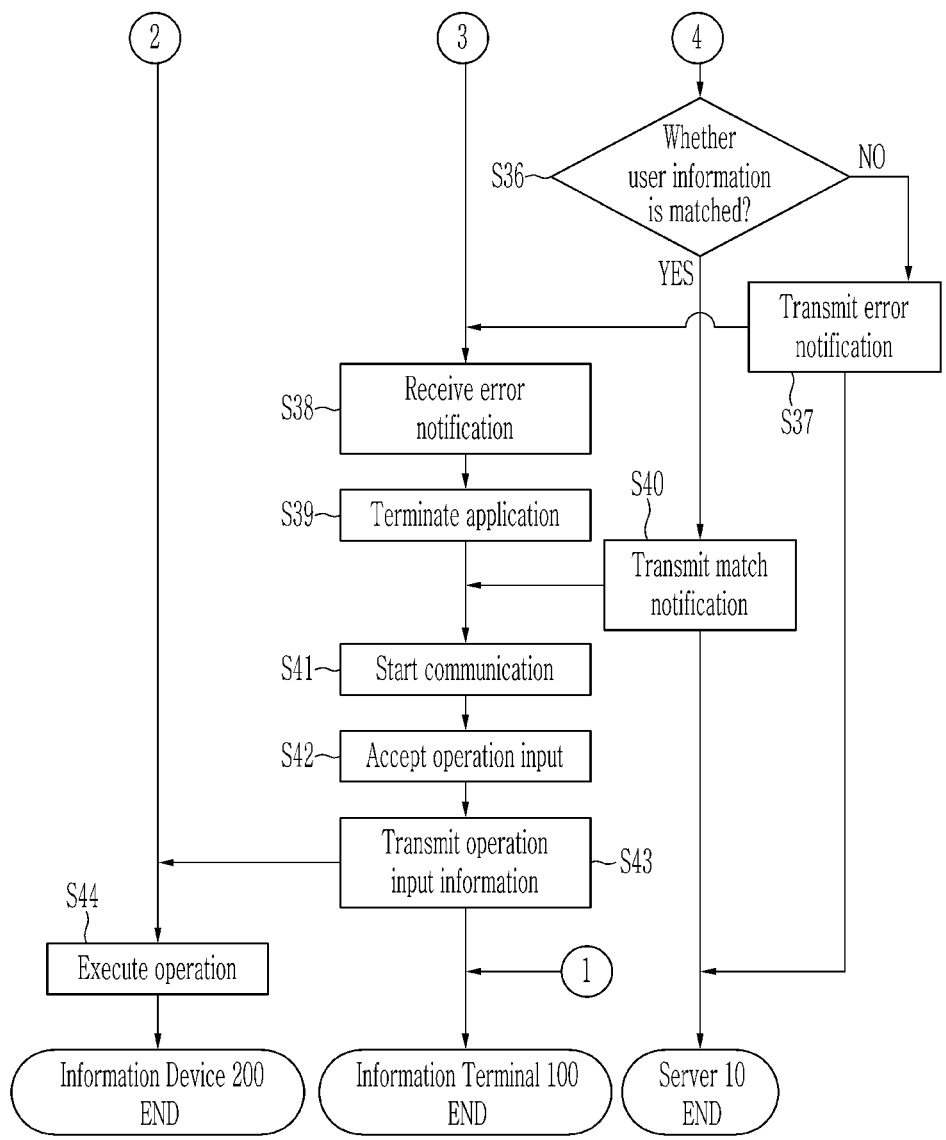
FIG. 7 is a flowchart showing a device operation process executed by a server 10, an information terminal 100, and an information device 200.

Next, a device operation process executed by an information device operating system 1 is described with reference to FIG. 6 and FIG. 7. FIG. 6 and FIG. 7 are flowcharts showing a device operation process executed by a server 10, an information terminal 100, and an information device 200. The processing executed by the above-described modules of each device described above is described together with this processing.

An application module 160 determines whether an activation input of an application for operating the information device 200 has been accepted (step S30). This application may be one application corresponding to one information device 200, or may be a standard application which is standardized to correspond to a plurality of information devices 200. In step S30, when the application module 160 determines that the activation input has not been accepted (NO in step S30), the application module 160 ends the present process.

On the other hand, when the application module 160 determines that the activation input has been accepted (YES in step S30), an authentication screen display module 163 displays an authentication content decision screen (step S31).

Figure 10:
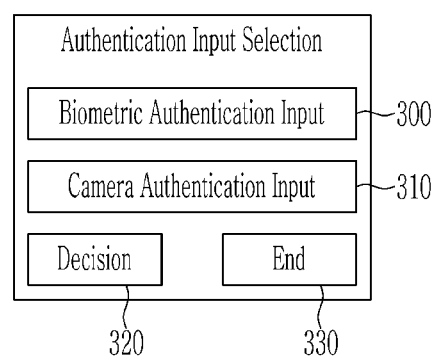
FIG. 10 is a diagram showing an example of an authentication content decision screen displayed by an information terminal 100.

The authentication content decision screen displayed by the authentication screen display module 163 is described with reference to FIG. 10. FIG. 10 is a diagram showing an example of the authentication content decision screen displayed by the authentication screen display module 163. In FIG. 10, the authentication screen display module 163 displays, as the authentication content decision screen, a notification indicating that it is a screen for deciding the authentication content, a biometric authentication input selection area 300, a camera authentication input selection area 310, a decision icon 320, and an end icon 330. The authentication screen display module 163 accepts an input to either of the biometric authentication input selection area 300 and or camera authentication input selection area 310, or both of them. The authentication screen display module 163 executes either of the inputted biometric authentication input or camera authentication input, or both of them, by accepting an input to the decision icon 320. In addition, the authentication screen display module 163 ends this process by accepting an input to the end icon 330.

The authentication screen display module 163 determines whether a selection input of biometric authentication information or camera authentication information has been performed (step S32). In step S32, the authentication screen display module 163 accepts an input to either of the biometric authentication input selection area 300 or the camera authentication input selection area 310, or both of them, and determines whether an input to the decision icon 320 has been accepted. In step S32, when the authentication screen display module 163 determines that no selection input is performed (NO in step S32), the authentication screen display module 163 repeats this processing.

In step S32, when determining that the selection input has been performed (YES in step S32), the authentication screen display module 163 accepts an input of the user authentication of either of the biometric authentication information or the camera authentication information, or both of the them, to which the selection input is performed (step S33).

In step S33, when the authentication screen display module 163 receives the input of the biometric authentication information, the application module 160 accepts a biometric authentication by a sensor or the like. The biometric authentication has the above-described configuration.

In addition, in step S33, when the authentication screen display module 163 accepts the input of the camera authentication information, the application module 160 accepts a camera authentication by an image capturing device or the like. The camera authentication has the above-described configuration.

The application module 160 acquires the above-described terminal information and personal information (step S34). The processing of step S34 is the same as the processing of step S23 described above.

A user information transmitting module 151 transmits user information including the accepted biometric authentication information or camera authentication information, the terminal information, and the personal information to the server 10 (step S35). The processing of step S35 is the same as the processing of step S24 described above.

A user information receiving module 20 receives the user information. An information comparing module 31 compares user information stored therein with the received user information, and determines whether the both user information matches (step S36). In step S36, the information comparing module 31 determines whether at least the biometric authentication information or the camera authentication information among the user information matches the corresponding one.

In step S36, the information comparing module 31 compares biometric authentication information included in the stored user information with the biometric authentication information included in the received user information, and determines whether they match in the same content. For example, when the received biometric authentication is a fingerprint, the same content means comparing the received fingerprint with a fingerprint in the stored biometric authentication information and determining whether they match.

In step S36, the information comparing module 31 compares camera authentication information included in the stored user information with the camera authentication information included in the received user information, and determines whether they match in the same content. For example, when the received camera authentication information is information on a face image of the user, the same content means comparing the received information on the face image with a face image in the stored camera authentication information and determining whether feature amounts match. Further, for example, when the received camera authentication information is information on a gesture made by the user, the received information on the gesture is compared with information on a gesture in the stored camera authentication information and it is determined whether feature amounts match.

In step S36, the information comparing module 31 may be configured to compare the biometric authentication information and camera authentication information included in the stored user information with the biometric authentication information and camera authentication information included in the received user information. In this case, it may be configured to determine whether the both match. Further, the information comparing module 31 may be configured to determine whether the terminal information or the personal information matches the corresponding one, in addition to the biometric authentication information or the camera authentication information. For example, the information comparing module 31 determines whether all the information matches the corresponding one.

In step S36, when the information comparing module 31 determines that the user information does not match the corresponding one (NO in step S36), an error notification transmitting module 21 transmits an error notification indicating mismatch of the user information to the information terminal 100 (step S37).

An error notification receiving module 152 receives the error notification. An error notification display module 164 displays the received error notification (step S38), and the application module 160 stops the activation of the application and terminates the application (step S39). According to the processing in step S38 and step S39, when the biometric authentication or the camera authentication does not match, the information terminal 100 can stop the operation of the application so as not to execute the operation of the information device 200.

On the other hand, in step S36, when the information comparing module 31 determines that the user information matches the corresponding one (YES in step S36), a match notification transmitting module 22 transmits a match notification indicating match of the user information to the information terminal 100 (step S40).

A match notification receiving module 153 receives the match notification. A device communication module 154 starts communication between the information terminal 100 and the information device 200 (step S41).

The application module 160 accepts an operation input to the information device 200 (step S42).

The device communication module 154 transmits operation input information indicating the accepted operation input to the information device 200 (step S43).

An operation input information receiving module 252 receives the operation input information. The information device 200 executes an operation based on the operation input information (step S44).

The above is the device operation process.

In the above-described device operation process, the processing executed by the server 10 may be executed by either of the information terminal 100 or the information device 200, or both of them. That is, the information device operating system 1 may be configured by the information terminal 100 and the information device 200. In this case, for example, it is possible for the information terminal 100 to execute the authentication of the user information by the server 10 described above.

In this way, an operator cannot be specified in a case of a number or PIN code authentication, whereas the operator can be easily specified in a case of the biometric authentication or camera authentication. In addition, because the operator is authenticated by the biometric authentication or camera authentication performed in the information terminal 100, there is no need to log in for each application when the information device 200 connected via the public network 5 is operated.

Modification

Next, a modification of the above-described embodiment is described. In the present modification, an information device operating system 1 includes a server 10, a plurality of information terminals 100, an information device 200, and a public line network 5. That is, the difference from the above-described embodiment is that the plurality of information terminals 100 exist. Further, the same reference numerals are given to the same elements as the above-described embodiment, and a detailed description thereof is omitted.

Device Operation Process

A device operation processing according to the present modification is described. Each of the plurality of information terminals 100 executes the above-described device authentication process and user information registration process.

Figure 8:
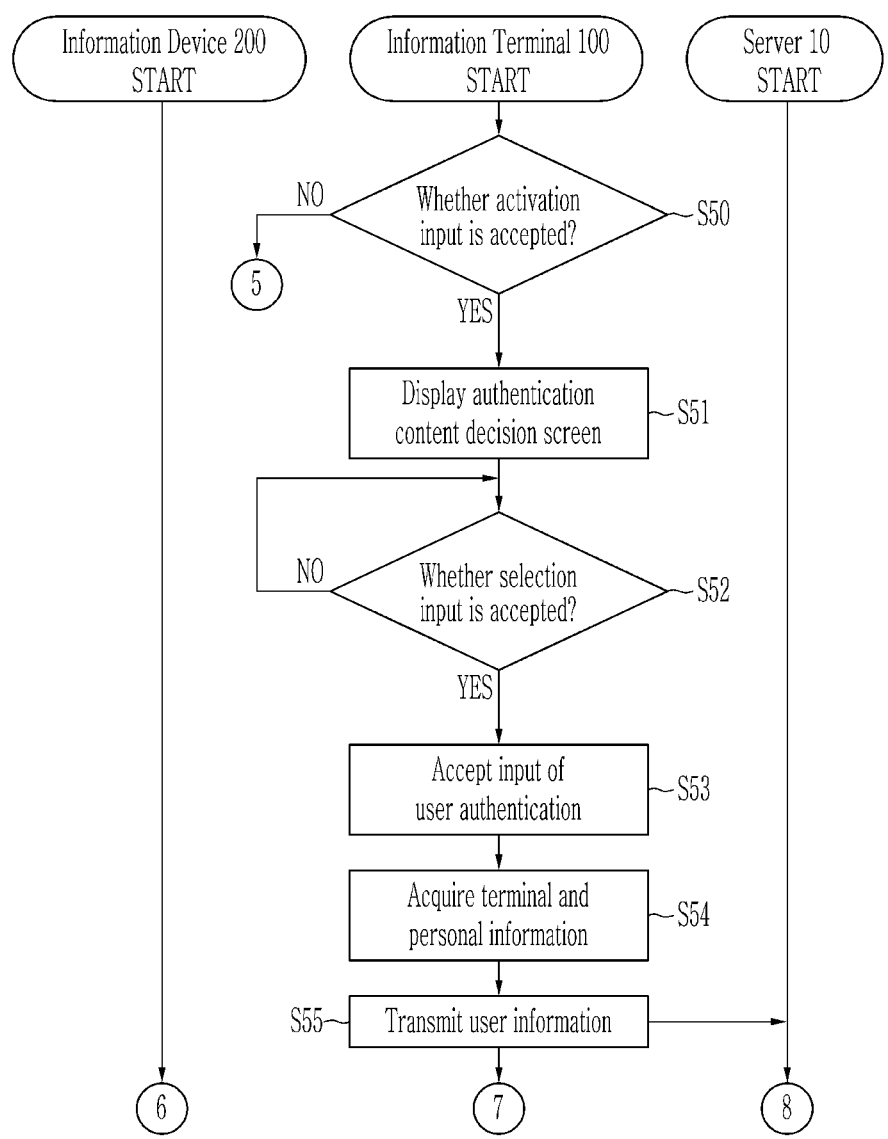
FIG. 8 is a flowchart showing a device operation process executed by a server 10, an information terminal 100, and an information device 200.
Figure 9:
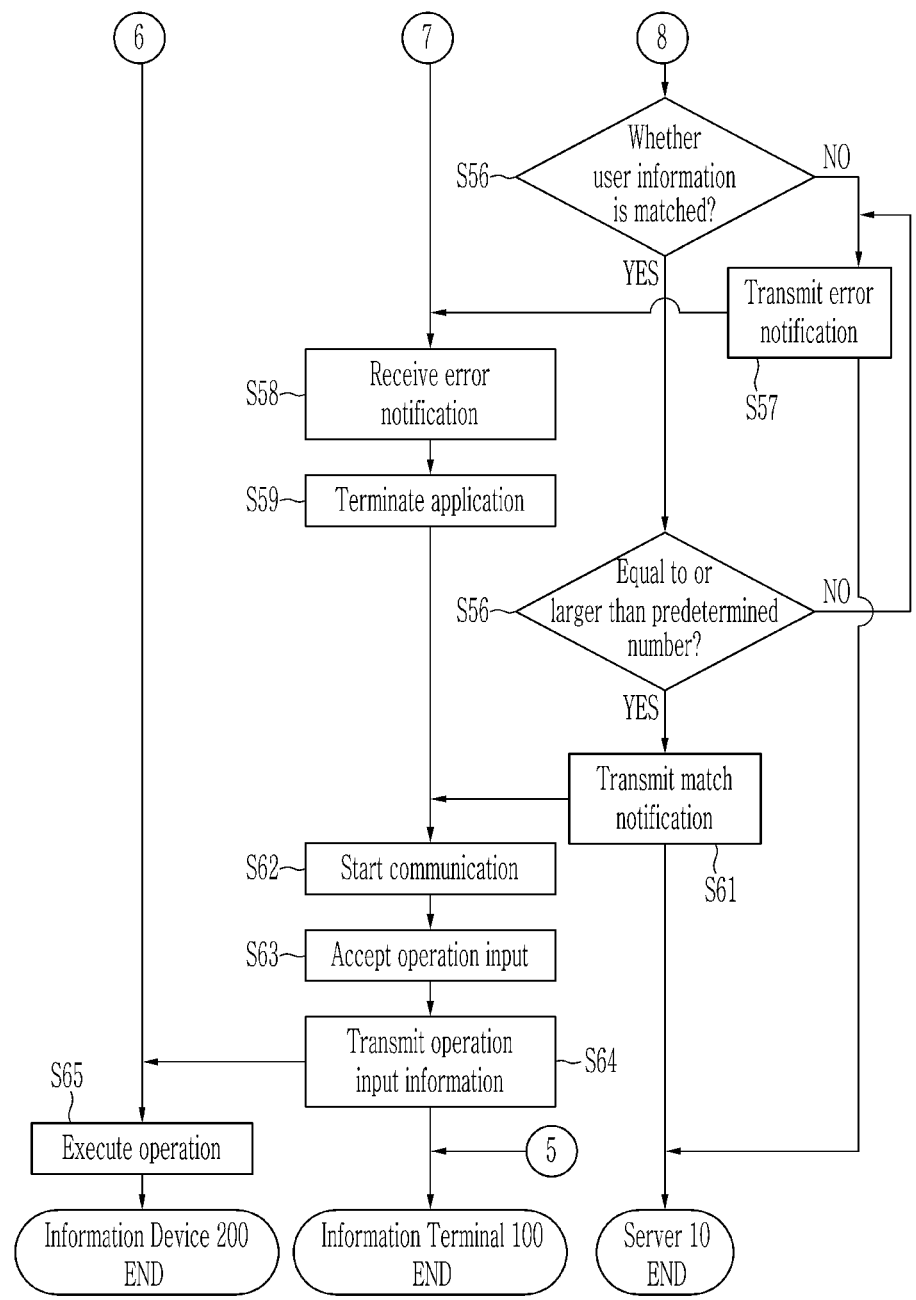
FIG. 9 is a flowchart showing a device operation process executed by a server 10, an information terminal 100, and an information device 200.

A device operation process executed by an information device operating system 1 is described with reference to FIG. 8 and FIG. 9. FIG. 8 and FIG. 9 are flowcharts showing a device operation process executed by a server 10, an information terminal 100, and an information device 200. The processing executed by the above-described modules of each device is described together with this processing.

The information terminal 100 and the server 10 execute the processing of the above-described steps S30 to S39 (steps S50 to S59).

On the other hand, in step S56, when an information comparing module 31 determines that user information matches the corresponding one (YES in step S56), the information comparing module 31 determines whether the number of users which are determined to be matched is equal to or larger than a predetermined number of people (step S60). The predetermined number of people is, for example, the number of all people which is registered as users of the information device 200 in advance, half of the number of registered people, the number of plural persons among the registered people, the number of all members belonging to a preset one group, half of the number of people belonging to the registered one group, the number of plural persons among the registered people, or the like. In step S60, when determining that the number of users is not equal to or larger than the predetermined number of people (NO in step S60), the information comparing module 31 executes the processing in step S57.

In addition, as a configuration other than the predetermined number of people, for example, a configuration in which different weights are given to the respective users of the information terminals 100 in advance and it is determined whether a total value of the weights is equal to or greater than a predetermined value may be used. For example, it is also possible to give weights according to positions or situations of users belonging to one group and to make the determination based on a total value of the weights regardless of the number of people. In detail, it is possible to use a configuration in which a weight of 10, a weight of 5, and a weight of 2 are given to user D, user E, and users F, G and H belonging to one group, respectively, and it is determined whether a total value of the weights is equal to or larger than 5. That is, when user information of only user D or user E matches the corresponding one, or when user information of three users, user F, user G, and user H, matches the corresponding one, it is determined to be matched. In this way, it is also possible for a person according to the responsibility or position to execute the operation of the information device 200.

On the other hand, when the information comparing module 31 determines that the number of users is equal to or larger than the predetermined number of people (YES in step S60), a match notification transmitting module 22 transmits a match notification indicating match of the user information and the number of people to the information terminal 100 possessed by the user of the information device 200 (step S61). In step S61, the match notification transmitting module 22 transmits a match notification to the plurality of information terminals 100.

The information terminal 100 and the information device 200 execute the processing of the above-described steps S41 to S44 (steps S62 to S65).

The above is the device operation process in the modification.

In the above-described modification, the user information including the terminal information and the personal information is determined as the user information, but the terminal information and the personal information may not be included in the user information. In this case, the information terminal 100 that performs a biometric authentication or a camera authentication may be the information terminal 100 that has been authenticated in the information device 200. Further, a plurality of applications for operating the above-described information device 200 may exist in one information terminal 100. For example, one application may be set for each user of a plurality of users, and the above-described process may be executed by this one application. That is, an application used by a certain user A may be different from an application used by another user B. In this case, the server 10 may be configured to transmit the match notification based on a fact that the user information of more than the predetermined number of users matches the corresponding one.

In this way, an operator cannot be specified in a case of a number or PIN code authentication, whereas the operator can be easily specified in a case of the biometric authentication or camera authentication. In addition, because the operator is authenticated by the biometric authentication or camera authentication performed in the information terminal 100, there is no need to log in for each application when the information device 200 connected via the public network 5 is operated.

The means and functions described above are realized by reading and executing a predetermined program by a computer (including a CPU, an information processing device, or various terminals). The program is provided, for example, in a form recorded in a computer-readable recording medium such as a flexible disk, a CD (e.g., CD-ROM or the like), a DVD (DVD-ROM, DVD-RAM, or the like), or the like. In this case, the computer reads the program from the recording medium and transfers the program to an internal storage unit or an external storage unit so as to be stored and executed. Furthermore, the program may be, for example, recorded in a storage device (recording medium) such as a magnetic disk, an optical disk, an optical magnetic disk, or the like in advance and be provided from the recording medium to the computer via communication line.

While the embodiments of the present invention have been described above, the present invention is not limited to the above-described embodiments. In addition, the effects described in the embodiments of the present invention are merely a list of the most preferable effects produced by the present invention, and the effects of the present invention are limited to those described in the embodiments of the present invention.

DESCRIPTION OF REFERENCE NUMBERS

1: information device operating system, 10: server, 100: information terminal, 200: information device

What is claimed is:

1. An information device operating system including a plurality of information terminals provided with a biometric authentication and an information device connected to the plurality of information terminals via a network, the information device operating system comprising:
one or more processors that:
detect that the biometric authentication has been made;
pre-assign different weights to respective users of the plurality of information terminals; and
when it is detected that the biometric authentication has been made for a first information terminal and at least one second information terminal among the plurality of information terminals, add the weights pre-assigned to the users of the first and second information terminals for which the biometric authentication has been made, and when a total value of the added weights is equal to or larger than a predetermined value, operate the information device by using an application installed in the first information terminal.

2. The information device operating system according to claim 1, wherein the application is a standardized application, and
wherein the one or more processors operate the information device by using the standardized application.

3. The information device operating system according to claim 1, wherein the different weights are pre-assigned to the users according to positions or situations of the users in a group.

4. An information device operating system including a plurality of information terminals provided with a camera authentication and an information device connected to the plurality of information terminals via a network, the information device operating system comprising:
one or more processors that:
detect that the camera authentication has been made;
pre-assign different weights to respective users of the plurality of information terminals; and
when it is detected that the camera authentication has been made for a first information terminal and at least one second information terminal among the plurality of information terminals, add the weights pre-assigned to the users of the first and second information terminals for which the camera authentication has been made, and when a total value of the added weights is equal to or larger than a predetermined value, operate the information device by using an application installed in the first information terminal.

5. The information device operating system according to claim 4, wherein the application is a standardized application, and
wherein the one or more processors operate the information device by using the standardized application.

6. The information device operating system according to claim 4, wherein the different weights are pre-assigned to the users according to positions or situations of the users in a group.

7. An information device operating method performed by an information device operating system including a plurality of information terminals provided with a biometric authentication and an information device connected to the plurality of information terminals via a network, wherein different weights are pre-assigned to respective users of the plurality of information terminals, the information device operating method comprising:
detecting that the biometric authentication has been made; and
when detecting that the biometric authentication has been made for a first information terminal and at least one second information terminal among the plurality of information terminals, adding the weights pre-assigned to the users of the first and second information terminals for which the biometric authentication has been made, and when a total value of the added weights is equal to or larger than a predetermined value, operating the information device by using an application installed in the first information terminal.

8. The information device operating method according to claim 7, wherein the different weights are pre-assigned to the users according to positions or situations of the users in a group.

9. An information device operating method performed by an information device operating system including a plurality of information terminal provided with a camera authentication and an information device connected to the plurality of information terminals via a network, wherein different weights are pre-assigned to respective users of the plurality of information terminals, the information device operating method comprising:
   detecting that the camera authentication has been made; and
   when detecting that the camera authentication has been made for a first information terminal and at least one second information terminal among the plurality of information terminals, adding the weights pre-assigned to the users of the first and second information terminals for which the camera authentication has been made, and when a total value of the added weights is equal to or larger than a predetermined value, operating the information device by using an application installed in the first information terminal.

10. The information device operating method according to claim 9, wherein the different weights are pre-assigned to the users according to positions or situations of the users in a group.

11. A program stored in a non-transitory computer-readable storage medium for causing an information device operating system including a plurality of information terminal provided with a biometric authentication and an information device connected to the plurality of information terminals via a network, wherein different weights are pre-assigned to respective users of the plurality of information terminals, to execute:
   detecting that the biometric authentication has been made; and
   when detecting that the biometric authentication has been made for a first information terminal and at least one second information terminal among the plurality of information terminals, adding the weights pre-assigned to the users of the first and second information terminals for which the biometric authentication has been made, and when a total value of the added weights is equal to or larger than a predetermined value, operating the information device by using an application installed in the first information terminal.

12. The program according to claim 11, wherein the different weights are pre-assigned to the users according to positions or situations of the users in a group.

13. A program stored in a non-transitory computer-readable storage medium for causing an information device operating system including a plurality of information terminal provided with a camera authentication and an information device connected to the plurality of information terminals via a network, wherein different weights are pre-assigned to respective users of the plurality of information terminals, to execute:
   detecting that the camera authentication has been made; and
   when detecting that the camera authentication has been made for a first information terminal and at least one second information terminal among the plurality of information terminals, adding the weights pre-assigned to the users of the first and second information terminals for which the camera authentication has been made, and when a total value of the added weights is equal to or larger than a predetermined value, operating the information device by using an application installed in the first information terminal.

14. The program according to claim 13, wherein the different weights are pre-assigned to the users according to positions or situations of the users in a group.

* * * * *